United States Patent [19]

Ross

[11] 4,326,458

[45] Apr. 27, 1982

[54] PRINTING APPARATUS

[75] Inventor: William L. Ross, Nr. Uckfield, England

[73] Assignee: Sign Electronics Limited, Middlesex, England

[21] Appl. No.: 168,761

[22] Filed: Jul. 11, 1980

[30] Foreign Application Priority Data

Jul. 19, 1979 [GB] United Kingdom ............... 25252/79

[51] Int. Cl.3 ............................................. G01D 15/06

[52] U.S. Cl. ............................... 101/1; 101/DIG. 13; 346/155; 339/61 M; 400/121

[58] Field of Search ........................ 101/1 R, DIG. 13; 29/850; 346/155; 400/119, 121; 339/61 M

[56] References Cited

U.S. PATENT DOCUMENTS

| | | | |
|---|---|---|---|
| 3,329,961 | 7/1967 | Schwertz et al. | 101/DIG. 13 |
| 3,441,938 | 4/1969 | Markgraf | 101/DIG. 13 |
| 3,680,037 | 7/1972 | Nellis et al. | 339/61 M |
| 3,701,996 | 10/1972 | Perley | 101/DIG. 13 |
| 3,722,995 | 3/1973 | Dahlquist | 346/110 R |
| 3,733,613 | 5/1973 | Koch et al. | 101/DIG. 13 |
| 3,766,850 | 10/1973 | Silverberg | 101/DIG. 13 X |
| 3,769,628 | 10/1973 | Kenny | 101/DIG. 13 |
| 3,893,128 | 7/1975 | Bauerlen | 346/155 |
| 4,092,650 | 5/1978 | Hinz | 346/155 |
| 4,219,927 | 9/1980 | Fukutomi et al. | 346/155 |

FOREIGN PATENT DOCUMENTS

| | | | |
|---|---|---|---|
| 1934149 | 1/1971 | Fed. Rep. of Germany | 101/DIG. 13 |
| 2648298 | 4/1978 | Fed. Rep. of Germany | 101/DIG. 13 |
| 2827081 | 12/1978 | Fed. Rep. of Germany | 101/DIG. 13 |
| 2852353 | 6/1979 | Fed. Rep. of Germany | 101/DIG. 13 |
| 1511198 | 5/1978 | United Kingdom | 101/DIG. 13 |

OTHER PUBLICATIONS

Patent Abstracts of Japan, vol. 4, No. 1, Jan. 8, 1980, p. 90E, 163.

"Conductive Elastomer Compositions for Xero Graphic Devices", Eddy et al., XE Disclosure Journal, vol. 3, No. 4, Jul. 78, pp. 199–200.

"Fiber Printing", Semple, IBM Tech. Discl. Bulletin, vol. 6, No. 1, Jun. 1963, p. 108.

*Primary Examiner*—E. H. Eickholt

*Attorney, Agent, or Firm*—Wood, Herron & Evans

[57] ABSTRACT

In a printer of the type in which print is formed on a drum by an electrostatic process in which charges in the shape of the characters to be printed are placed on the surface of the drum and after development the print is transferred therefrom onto a print receiving surface of a print medium by means solely of pressure acting between the print medium and the drum and in which the drum comprises an electrically conductive former having a cylindrical surface uniformly coated with a dielectric layer, a drum charging system which comprises an array of parallel conductors and an elastomeric laminate 5 in the form of a strip having one end contacting each conductor of said array 2 of parallel conductors and the other end wiping the dielectric surface of the drum 3 along a line parallel to the drum axis, said laminate being formed by a plurality of contiguous layers which are alternately conductive and non-conductive, each of which layers is oriented to respectively extend from the array of conductors to the said drum in a plane normal to the axis of the latter. Each conductor is connected to a respective pulse driver and the pulse drivers are connected to a character generating means. In the preferred arrangement the array of parallel conductors comprises an array of conductors on a printed circuit board. The system is shown embodied in a hand manipulatable printer and also in a high speed line printer.

18 Claims, 8 Drawing Figures

PRINTING APPARATUS

FIELD OF INVENTION AND RELATED APPLICATIONS

Figure 1:
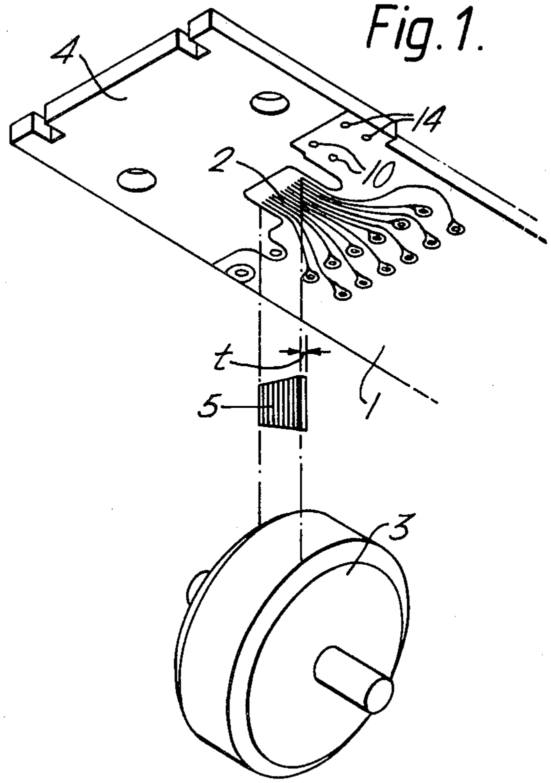

The present invention relates to printing apparatus and is particularly concerned with improvement in the apparatus described in the copending British patent application No. 25281/77 of which I was the inventor and my corresponding U.S. continuation-in-part application Ser. No. 168,377 filed July 10, 1980.

In pending British Pat. application No. 25281/77 and the said continuation-in-part application Ser. No. 168,377 there are described various forms of apparatus for printing by an electrostatic process material obtained from electronic signal sources such as an electronic typewriter or computer output. In particular there is described in that specification novel forms of printing heads containing on a very small scale some of the elements of the known xerographic copying equipment and by which any desired characters may be printed on any suitable medium such as a paper sheet. The characters to be printed, or component parts thereof, take the form of erasable electrical charge distributions on the surface of a printing drum. Ink, which may be applied either in liquid form or as a powder, adheres selectively to the charged areas and is transferred to the surface to be printed as the drum rotates in contact therewith. The drum is then cleaned and discharged to receive further images.

In such a device, which needs to be made on a small scale for the uses envisaged, various problems arise in connection with the transference of electrical charge patterns to the surface of the drum.

The present invention is concerned with the solution of this problem and is based on the use of a product, known for other purposes, consisting of an elastomeric laminate formed as a member having defined planar surfaces and comprising a plurality of finely structured layers perpendicular or substantially perpendicular to said surfaces which are alternately electrically conductive and non-conductive. Such a product, known as Zebra, is manufactured by Technical Wire Products Inc. under U.S. Pat. No. 3,680,037. Typically there may be 240 conductive layers to the linear inch, i.e. said layers have a pitch of approximately 4 thousandths of an inch. This product is intended for use as a multi-channel connector and can be used to connect an array of closely spaced fine conductors such as may be formed on a printed circuit board to an array of terminals or other conductors by clamping the product in strip form between the two arrays. Each conductor of the array will then be connected individually to the appropriately opposed terminal or opposed conductor without the need for making individual connections. Because of the fine structure of the strip in relation to the structure of the printed circuit array it is ensured that at least some of the conductive layers of the multi-channel connector will individually bridge the gap between a conductor of the array and the corresponding terminal or opposed conductor while at least some insulating layers will lie between each bridged conductor-terminal pair or conductor—conductor pair and its neighbouring pairs.

It is now proposed that this product in strip form be used as a precisely configured electrode array to set up a charge pattern of fine structure on the printing drum of a printing head of the kind above described.

According to the invention in one aspect thereof a printing head for an electrostatic printer of the type referred to herein commprises:

(a) housing means;

(b) a print drum supported for rotation about an axis in said housing means, said print drum having a cylindrical surface formed by a uniform dielectric layer on a conductive cylindrical former, and said housing means incorporating a printing station at which the print is transferred to said print medium;

(c) means for connecting said conductive former to a first potential source;

(d) an image forming means positioned in said housing means adjacent said drum and at a position spaced circumferentially with respect to the printing station, said image forming means comprising an array of conductors each for connection to a respective pulse source means and an electrode member having a first end in contact with each of the conductors of said conductor array and a second end extending into direct physical contact with the dielectric layer on the periphery of the drum, said second end contacting the length of the drum and said member being of an elastomeric material and comprising a laminate having alternating electrically conductive and non-conductive layers arranged perpendicularly to said array of conductors and having a structure which is finely divided in relation to the structure of said array of conductors;

(e) means for detecting the angular displacement of the drum due to rotation thereof in the housing;

(f) means connected to said respective pulse source means and to said means for detecting the angular displacement of the drum for selectively enabling the former whereby the conductors are pulsed in a prescribed sequence with a voltage signal derived from a second potential source in response to the angular displacment of the drum so as to form a charge image of one or more preselected characters on said dielectric surface; and (g) inking means positioned in said housing means adjacent the said drum and between the image forming means and the printing station, said inking means including means for supplying ink and means for applying said ink to the drum after said charge image has been formed and before the charge image has reached the printing station as a result of rotation of the drum whereby print corresponding to one or more characters is formed by ink adhering to the charged areas on the dielectric surface of the drum, said ink applying means comprising at least one electrode means for connection to a third potential source which is spaced from said drum and is arranged so that the electrostatic field which is formed as each charge image passes the electrode means causes transfer of ink from the ink applying means to the areas on the drum on which the charge defining the charge image is confined.

It has been found that with such an arrangement, the charging surface of the electrode member presents a pattern of charges corresponding in the direction transverse to the grain thereof closely to the pattern of the output leads to which it is clamped but is more finely divided. Accordingly, the electrical circuit means may include a printed circuit having an array of conductors distributed across an area corresponding to the desired charge pattern area in one dimension and the elastomeric member is clamped across said array of conductors and has a dimension across its grain corresponding to the dimension of the desired charge area in the same direction, e.g. corresponding to the height of the characters to be printed. The "grain" of the elastomeric member herein referred to means the direction in which the component layers of the member lie so that the member offers discrete conductivity properties in directions "along the grain" but is totally non-conductive in directions "transverse to the grain".

Figure 2:
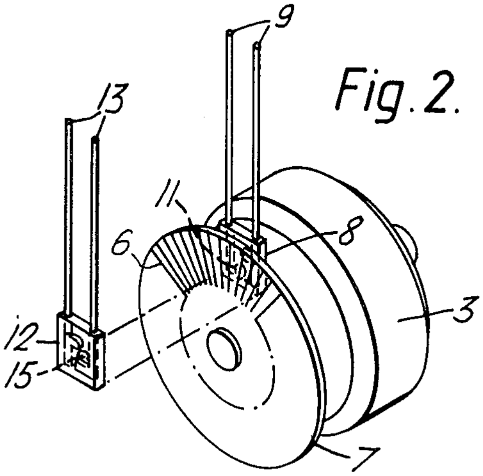
Figure 3:
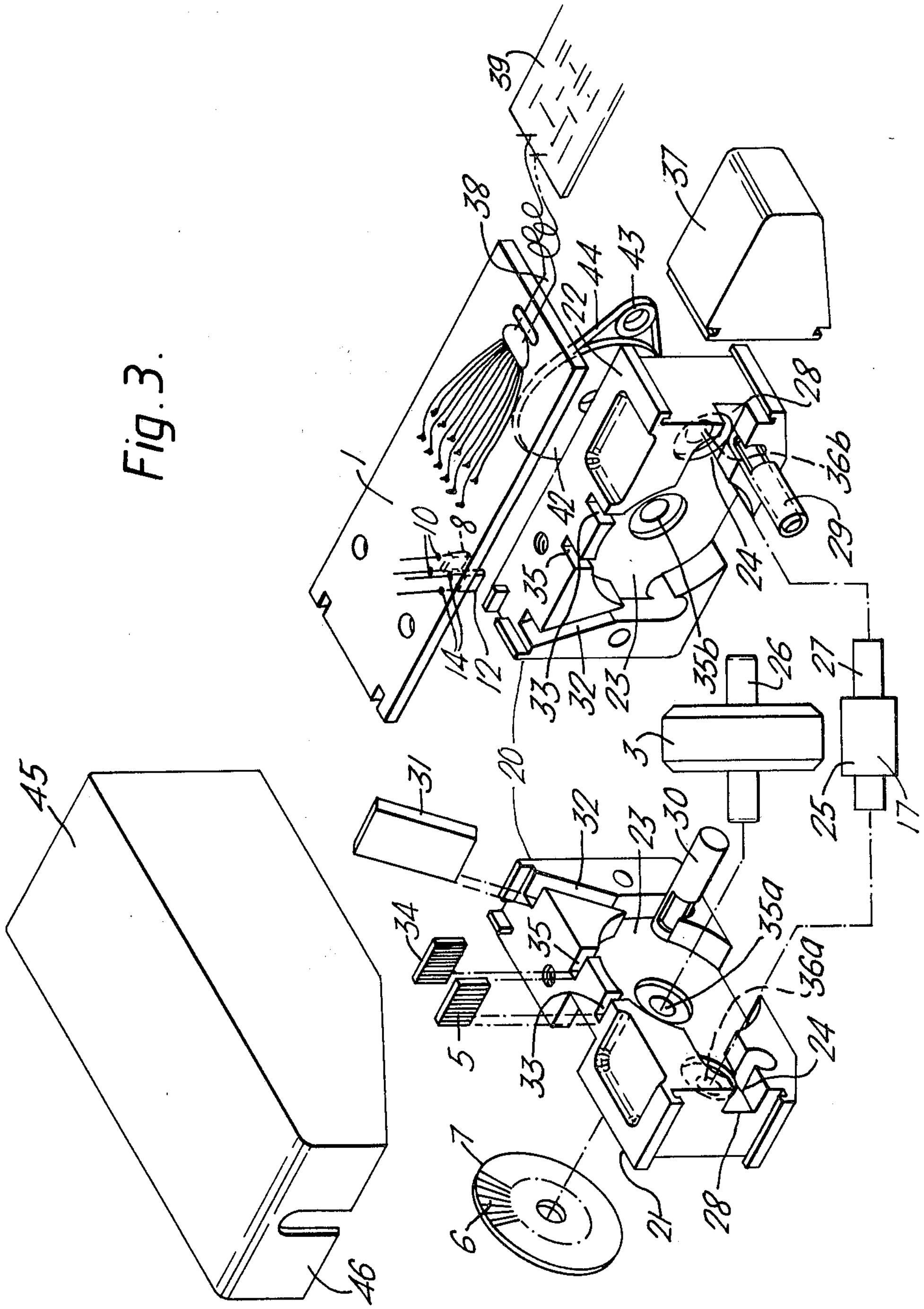
Figure 4:
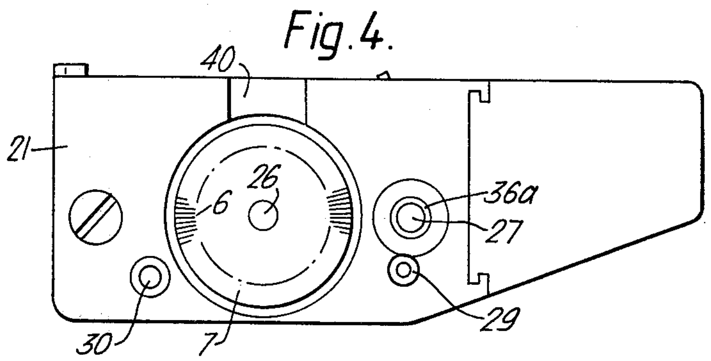
Figure 5:
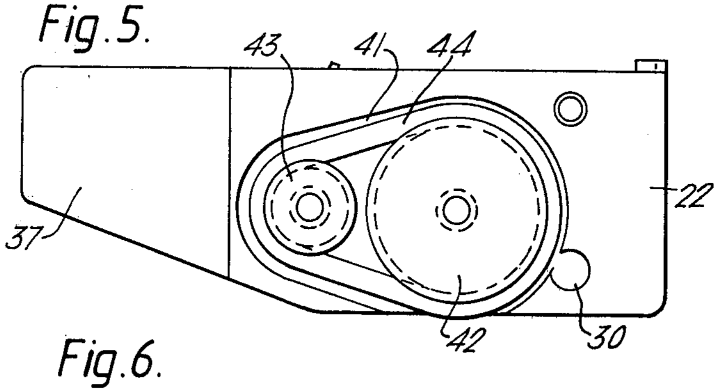
Figure 6:
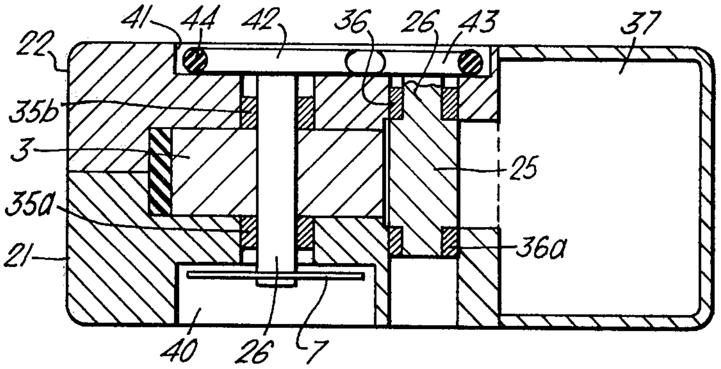
Figure 7:
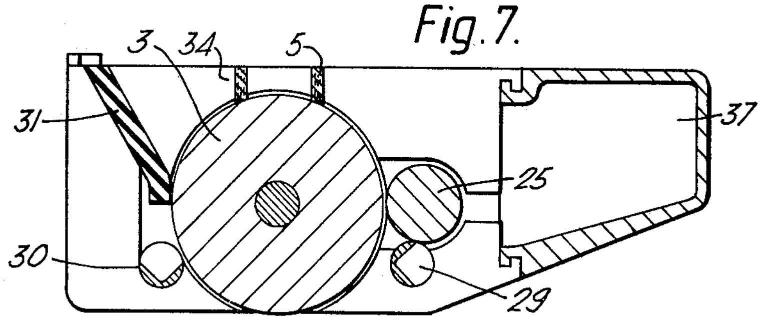
Figure 8:
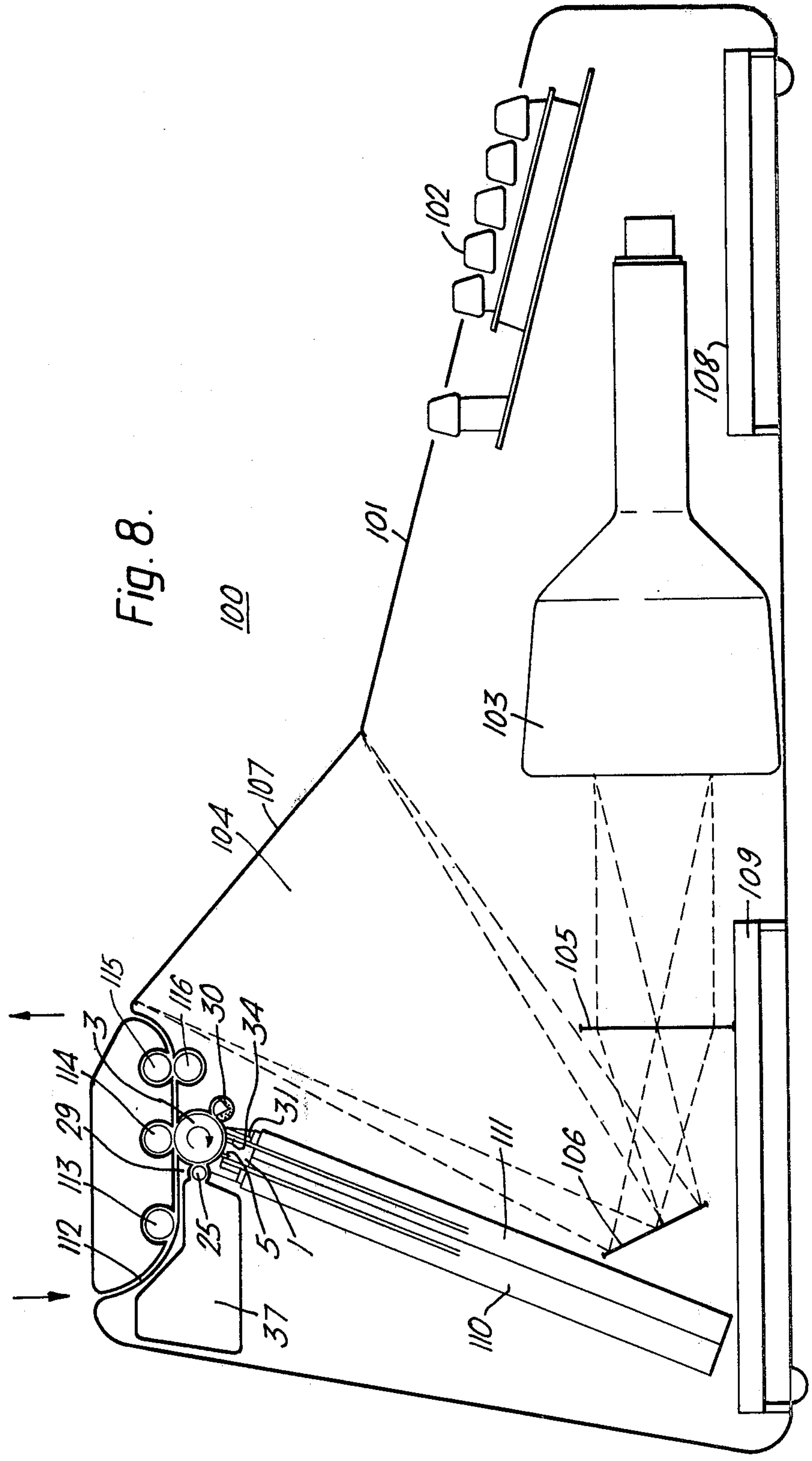

In order that the invention may be better understood an embodiment thereof will now be described with reference to the accompanying drawings, in which:

FIG. 1 is an expanded diagrammatic view of the printing drum electrode system used in the invention, FIG. 2 shows a view of an end face encoder mounted on the printing drum, FIG. 3 shows in an expanded view a print head embodying the features of FIGS. 1 and 2, FIG. 4 is a side view of the print head without its cover and looking towards the shell 21, FIG. 5 is a side view of the print head without its cover and looking towards the shell 22, FIG. 6 is a horizontal section of the print head of FIG. 4 in the plane containing the axis of rotation of the printing drum and the inking roller, FIG. 7 is a vertical section of the print head of FIG. 4 in the plane containing the vertical mating surfaces of the shells 21 and 22, and FIG. 8 is a section of a line printer embodying the features of FIGS. 1 and 2.

In FIG. 1 a portion of a printed circuit board 1 is shown on which there is disposed an array 2 of conductors which carry elemental pulses from electronic circuitry shown in the aforesaid prior applications for setting up a charge pattern corresponding to a desired character on the surface of a drum 3 of dielectric material mounted for rotation in a housing (not shown in FIG. 1) carrying the parts of a handheld printing head, said drum constituting the printing drum thereof. A film 4 of copper forming an earth shield is disposed on the circuit board on one side of the array 2. The remainder of the board is used for circuit connections. The arrangement is shown on a much enlarged scale as will be appreciated.

The conductor array 2 represents the array of signal points making up one dimension of a character to be printed, suitably the height and extends across the axial length of the drum. It may, for example, contain twelve conductors representing twelve image points in the vertical dimension of a print character. The horizontal dimension of the character is then generated as a time dimension linked to rotation of the printing drum.

A strip 5 of elastomeric laminate of the kind referred to above and shown herein separated from the board 1 is normally pressed along one end edge across the array of conductors 2 and forms the electrode structure. Its grain of 240 conductors per linear inch is too fine to be shown in detail even on the enlarged scale of the drawing and is only represented in FIG. 1. At its other end edge (though again shown separated in FIG. 1) it is pressed onto the cylindrical surface of the drum 3.

The dimension t of the free upper edge of the strip 3 determines the minimum dimension of the character in a horizontal sense. However, as the surface of the drum moves in relation to the electrode structure the horizontal dimension of any part of the character may be drawn out to any required extent in accordance with the signals supplied over the conductor array 2. Conveniently the individual conductors of the array 2 are of substantially the same width as the dimension t of the electrode structure so that the gross charged area generated by each electrode of the electrode assembly in response to a momentary signal applied to a single conductor will be substantially a square area of side t. By suitably traversing the surface of the drum over the electrode structure and feeding the appropriate pattern of pulses to the conductor array 2 a mosaic of such charge patterns can be built up to form any desired image in the manner of a half-tone picture.

Obviously, by making the separations between the conductors 2 minimal the half-tone structure in the vertical dimension can be made very fine. In the horizontal dimension the image structure can be made continuous rather than half-tone, by suitably maintaining the signals on conductors 2 as the printing drum rotates.

In the device intended to be held in the hand and drawn over the paper manually, the speed at which the drum is turned is unpredictable and not directly related to any of the electronic events by which the images to be printed are generated. Accordingly it is necessary to monitor the turning of the drum and for this purpose a rotary indexing encoder is needed. In FIG. 2 a suitable encoder is illustrated diagrammatically. This consists of a circumferential array of radial equally spaced bars 6 printed onto the face of a transparent disc 7 which is mounted on an axle of the drum 3 for rotation therewith. A light emitting device 8 is mounted on the circuit board by inserting the leads 9 into the holes 10 in the board (see FIG. 1). Device 8 which contains a light emitting diode 11 is arranged so that the light from the diode 11 passes through the disc 7. This light is interrupted by the bars 6 as the drum 3 rotates. A physically similar device 12, similarly mounted on the circuit board 1 by its lead 13 which are inserted in holes 14, is arranged in the path of the light which is periodically interrupted by the bars 6. Device 12 contains a light sensing diode 15. In the preferred arrangement devices 8 and 12, which comprise well known proprietary devices, are mounted with minimum separation from the disc 7 to allow unimpeded rotation of the disc.

In FIGS. 3-7 the elements discussed in relation to FIGS. 1 and 2 are shown embodied in a hand-manipulated print head of the type disclosed in the aforesaid prior applications to which disclosure reference is hereby made. A housing 20 of insulating material, e.g. plastics, is formed in two basic parts or shells 21, 22 having respective mating faces in the vertical plane. These faces are recessed so that when the two shells are fastened together there are defined two intersecting chambers 23, 24 which respectively contain the print drum 3 and the inking roller 25. Chamber 23 intersects the bottom surface of the housing to thereby define a print window through which the printing drum projects. The printing drum 3 is formed by coating the cylindrical surface of a metallic former with a thin selenium layer and is a tight fit on an axle 26. The inking roller 25 likewise has a metallic former but is coated with a thin electrically conductive rubber layer 17 which has entrained within it magnetic particles. The rubber layer 17 is premagnetised alternately north and south along the length of the roller so as to form a succession of magnetic axially aligned zones around its periphery. The roller has an axle 27 formed integrally therewith. Chamber 24 is extended horizontally to intersect the rear surface of the housing and thereby define a window 28 which allows the passage of ink, of solid particulate form, from a slide-on hopper 37 wherein the ink is stored to the roller 25. A doctor blade 29 machined in a metallic bar is mounted adjacent the inking roller so as to control the film of ink carried thereon. The bar is apertured axially from one end to facilitate the removal from the housing 20 of ink debris. A similarly formed doctor blade 30 is mounted adjacent the printing drum and provides the first stage of ink and electric charge removal from the drum subsequent to printout of a print character carried thereon. A strip of soft conductive rubber 31 contained in an inclined slot 32, which extends into both housing shells 21, 22, bears at one end against the printing drum and at the other end against the earthed copper film 4 on the printed circuit board 1. A first conductor laminate strip 5, acting as the said elastomeric electrode array, is fitted with a second slot 33 which likewise extends into both housing shells 21, 22. A second conductor laminate strip 34 similar to strip 5 is fitted into a further slot 35, similar to slot 33. Strip 5 bears against the printing drum at one end and bridges the array of conductors 2 on the printed circuit board. Strip 34 likewise bears against the printing drum at one end but at its other end it bears against the earthed copper film on the printed circuit board. Strips 31 and 34 ensure that the electric charges on the printing drum are completely dispersed before any further characters are impressed upon the printing drum and that the drum is cleansed of all traces of ink. In an alternative embodiment (not shown) strip 34 may comprise part of a second electrode system including a second array of conductors. This enables the incremental charging areas on the drum to be more closely packed.

Metal bearing insert pairs 35*a*, 35*b*, 36*a and 36b* are fitted into appropriate passages in the housing shells 21, 22 so as to receive the respective axles 26, 27 of the printing drum 3 and the inking roller 25. One bearing insert of each pair is connected by a respective conductor (not shown), the circuit board and curly cable 38 to a respective source of potential provided by an interface circuit 39 housed externally of said print head.

Each housing shell 21, 22 contains a further recess 40 and 41 in the respective outer vertical face (see FIG. 6) and the axle 26 of the printing drum 3 penetrates into both recesses when the device is assembled. Recess 40 houses the transparent disc 7 which is mounted on one end of axle 26. At the other end of axle 26 there is mounted within recess 41 a pulley wheel 42. Recess 40 is extended upwards to intersect the top surface of the shell 21 immediately beneath the holes 10 and 14 in the printed circuit board, thereby providing a cavity for receiving the light emitting device 8 and the light sensing device 12, which devices depend from the printed circuit one on each side of the disc 7. Recess 41 intersects the bottom surface of the shell 22 to define a traction window the purpose of which is described below. Axle 27 of roller 25 penetrates only into recess 41 where it mounts a pulley 43 which is of somewhat smaller diameter than pulley 42. An elastic belt 44 of circular cross section is stretched and fitted over the two pulleys. Belt 44 projects through the aforesaid traction window to just slightly greater extent than the drum extends through the printing window.

A cover 45 of plastics material, having a slotted rear wall 46 to receive the cable 38 and an open bottom, slips over the assembled shells 31, 32 and clips into position thereon by means of suitable detents (not shown) moulded into the inner faces of the cover. The print head is coupled to an interface circuit 39 containing the pulse drivers 9 referred to in FIG. 1 of the said continuation in part application. A character generator and a character memory are connected to the interface circuit 39 as also shown in said continuation in part application.

The print head operates in similar manner to that described in the said prior applications. Thus, a line of data of suitable length is first inserted into the memory as before. The print head is then pressed onto the print receiving surface and drawn across it in the direction towards the ink hopper 37. The friction between the belt 44 and the print medium and between the belt and the pulleys 42, 43 causes both the drum and the inking roller to rotate. As the drum rotates signals representing this rotation are picked-up by the encoder and transmitted to the character generator via the interface circuit 39. A sequence of signals corresponding to the character to be printed is then generated and used to drive pulsing means connected to each of the conductors of the array of conductors 2 (see FIG. 1) on the printed circuit board 1. These pulses are conveyed to the drum by means of the very thin conductors provided in the laminate 5 where they set up an extremely finely structured charge image corresponding to the character to be printed. As further rotation of the drum occurs the portions of the drum bearing the pattern of charges passes by the rotating inking roller where the intense electrostatic field in the plane containing the two axes of rotation causes controlled amounts of ink to migrate from the inking roller to the areas containing the charge. Further rotation brings the inked area of the drum into registration with the printing window and the pressure of the print medium on the drum causes the ink to be transferred to the surface of the print medium. Thereafter with further rotation of the drum the previously inked areas of the drum are cleaned of ink residues and are electrically discharged by means of the blade 30 and the flexible conductive strips 31 and 34. During the processes just described other print characters will be sequentially developed on the drum and printed out and the process continues until all the information within the memory is printed.

From the foregoing description those skilled in the art will understand that the mechanical problems associated with avoiding misregistration between the individual electrodes and the drum and maintain contact therebetween and the problem of providing a finely structured image in a printer of such small dimensions are overcome in a surprisingly simple manner.

The advantages provided by the invention are not restricted to hand manipulated printers and may be observed, for example, in the line printer 100 shown diagrammatically in FIG. 8 wherein like numerals refer to structures having similar functions to the corresponding structures of the device illustrated in FIGS. 3–7. As shown, the line printer 100 incorporates within a single housing 101 all the elements of the system illustrated in FIG. 1 of the aforesaid continuation-in-part and British Pat. applications including a keyboard 102, a video monitor comprising the cathode ray tube 103 and optical system 104 including lens 105, mirror 106 and display screen 107. The memory, character generator interface circuits and the conductor pulse drivers are distributed amongst the circuit boards 108, 109, 110 and 111. The line printer differs from the print head illustrated in FIGS. 3 to 7 herein principally in that there is no translatory movement of the print head, the printing medium comprising sheets of paper is translated through the channel 112 instead, and that the print drum 3, the inking roller 25, the Zebra strip 5, and all the other components functionally associated with the character development are extended in length to correspond with the length of a standard line of print. The charge images of a whole line of characters are generated simultaneously by the character generator, but turned through 90 degrees with respect to the axis of the printing drum. An extended array of conductors (not shown) is provided on the printed circuit board 1 alongside an edge thereof and instead of making end contact with the board the Zebra strip 5 is clamped flat over the array so that a portion thereof overlaps the board and wipes the printing drum. An earthed sheet of copper is provided on the reverse side of the board 1 and the strip 34 is clamped flat onto this so that it also overlaps the board and wipes the drum 3. The paper to be printed on is driven through the channel 112 by means of a drive roller 113 and is pressed against the printing drum 3 by roller 114 to facilitate transfer of the print from the drum to the roller. A heat fusible ink is used and heated rollers 115, 116 and provided to ensure that the print is firmly fused onto the paper.

In operation data is inserted into the memory either by an operator keying-in the data by means of the keyboard 102 or by operating the device on line from a data processor in the manner known per se. When the memory is filled, i.e. a page of information is displayed on the screen 107, a sheet of paper is fed into the channel 112. This paper is transported past the printing drum 3 and emerges from the channel 112 fully printed. In practice it is found that print-out takes no more than a second and that several thousand characters with good definition can be printed on the one paper in this time. With continuous operation on line from a data processor and with printing onto a web of paper, a print output of at least 50,000 characters per second can be envisaged, which output is probably greater than existing requirements.

Whilst specific embodiments of the invention have been disclosed herein it will be understood by those having normal skill in the art that various changes and modifications can be made therein without departing from the spirit of this invention.

I claim:

1. In a printer of the type in which print is formed on a drum by an electrostatic process and is transferred therefrom onto a print receiving surface of a print medium by means solely of pressure acting between the print medium and the drum an improved print head comprising in combination:

(a) housing means;

(b) a print drum supported for rotation about an axis in said housing means, said print drum having a cylindrical surface formed by a uniform dielectric layer on a conductive cylindrical former, and said housing means incorporating a printing station at which the print is transferred to said print medium;

(c) means for connecting said conductive former to a first potential source;

(d) an image forming means positioned in said housing means adjacent said drum and at a position spaced circumferentially with respect to the printing station, said image forming means comprising an array of conductors extending normally to a first plane containing the axis of rotation of the drum and in a second parallel to a tangent of said drum, each conductor of said array being for connection to a respective pulse source means, and further comprising an elongate electrode means having a first end in contact with each of the conductors of said conductor array and a second end extending along a line parallel to the drum axis in direct physical contact with the dielectric layer on the periphery of the drum, said electrode means comprising a strip of an elastomeric material in the form of a laminate having alternating electrically conductive and non-conductive layers, each layer mounted to respectively extend between said array of conductors and said drum in a plane normal to the axis of the latter, and having a structure which is finely divided in relation to the structure of said array of conductors;

(e) means for detecting the angular displacement of the drum due to rotation thereof in the housing;

(f) means connected to said respective pulse source means and to said means for detecting the angular displacement of the drum for selectively enabling the pulse source means whereby the conductors are pulsed in a prescribed sequence with a voltage signal derived from a second potential source in response to the angular displacement of the drum so as to form a charge image of one or more preselected characters on said dielectric surface; and (g) inking means positioned in said housing means adjacent the said drum and between the image forming means and the printing station, said inking means including means for supplying ink and means for applying said ink to the drum after said charge image has been formed and before the charge image has reached the printing station as a result of rotation of the drum whereby print corresponding to one or more characters is formed by ink adhering to the charged areas on the dielectric surface of the drum, said ink applying means comprising at least one electrode means for connection to a third potential source which is spaced from said drum and is arranged so that the electrostatic field which is formed as each charge image passes the electrode means causes transfer of ink from the ink applying means to the areas on the drum on which the charge defining the charge image is confined.

2. A print head according to claim 1 wherein the electrode means of the ink applying means comprises a cylindrical roller arranged for rotation in said housing on an axis parallel to the axis of rotation of said drum and means for rotating the roller when the said drum rotates at a rate proportional thereto, said roller being of considerably smaller diameter than the drum and being spaced therefrom at such a distance that the surface of the drum and the facing surface of the roller closely approach one another only along the plane containing the two axes of rotation.

3. A print head according to claim 2 wherein the ink for use by the ink supplying means is a dry particulate material comprising appropriate pigments and magnetizable material all carried in a pressure fusible resin base and said inking roller has an outer surface formed by a sleeve of electrically conductive rubber wherein magnetic particles are entrained, said sleeve being premagnetized across the length of the roller in discrete spaced apart bands around the periphery thereof.

4. A print head according to claim 3 further comprising a doctor blade means disposed alongside the roller parallel to the axis of rotation of the roller and spaced from the outer surface thereof so as to control the formation and thickness of a film of ink on the said surface particularly on that portion instantly about to come into correspondence with the said drum as a consequence of rotation of the roller.

5. A hand motivated print head for printing characters upon a surface of a print receiving medium comprising:

(a) a manually manipulatable housing for permitting relative motion between said housing and said medium;

(b) a print drum supported for rotation about an axis in said housing, said print drum having a cylindrical surface formed by a uniform dielectric layer on a conductive cylindrical former, and said housing incorporating a window through which a peripheral portion of said drum projects and through which the print characters are transferred to said print medium;

(c) means for connecting said conductive former to a first potential source;

(d) an image forming means positioned in said housing adjacent said drum at a position on the opposite side of the drum to the position of said window, said image forming means comprising an array of conductors extending normally to a first plane containing the axis of rotation of the drum and in a second plane parallel to a tangent of said drum, each conductor of said array being for connection to a respective pulse source means, and further comprising an elongate electrode means having a first end in contact with each of the conductors of said conductor array and a second end extending along a line parallel to the drum axis in direct physical contact with the dielectric layer on the periphery of the drum, said electrode means being formed of an elastomeric material in the form of a laminate having alternating electrically conductive and non-conductive layers each layer oriented to respectively extend between said array of conductors and said drum in a plane normal to the axis of the latter and having a structure which is finely divided in relation to the structure of said array of conductors;

(e) means for detecting the angular displacement of the drum due to rotation thereof in the housing;

(f) means connected to said respective pulse source means and to said means for detecting the angular displacement of the drum for selectively enabling the pulse source means whereby the electrodes are pulsed in a prescribed sequence with a voltage signal derived from a second potential source in response to the angular displacement of the drum so as to form a charge image of one or more preselected characters on said dielectric surface; and (g) inking means positioned in said housing adjacent said drum and between the image forming means and the said window, said inking means including means for supplying ink and means for applying said ink to the drum after said charge image has been formed and before the charge image has reached the said window as a result of rotation of the drum whereby print corresponding to one or more characters is formed by the ink adhering to the charged areas on the dieletric surface of the drum, said ink applying means comprising at least one electrode means for connection to a third potential source which is spaced from said drum and is arranged so that the electrostatic field which is formed as each charge image passes the electrode means causes transfer of ink from the ink applying means to the areas on the drum on which the charge defining the charge image is confined.

6. A print head according to claim 5 wherein said array of conductors comprises an array of conductors on a printed circuit board.

7. A print head according to claim 5 wherein the electrode means of the ink applying means comprises a cylindrical roller arranged for rotation in said housing on an axis parallel to the axis of rotation of said drum and means for rotating the roller when the said drum rotates at a rate proportional thereto, said roller being of considerably smaller diameter than the drum and being spaced therefrom at such a distance that the surface of the drum and the facing surface of the roller closely approach one another only along the plane containing the two axes of rotation.

8. A print head according to claim 7 wherein the ink for use by the ink supply means is a dry particulate material comprising appropriate pigments and magnetizable material all carried in a pressure fusible resin base and said inking roller has an outer surface formed by a sleeve of electrically conductive rubber wherein magnetic particles are entrained, said sleeve being premagnetized across the length of the roller is discrete spaced apart bands around the periphery thereof.

9. A print head according to claim 7 further comprising a doctor blade means disposed alongside the roller parallel to the axis of rotation of the roller and spaced from the outer surface thereof so as to control the formation and thickness of a film of ink on the said surface particularly on that portion instantly about to come into correspondence with the said drum as a consequence of rotation of the roller.

10. A print head according to claim 7 wherein said means for rotating the roller comprises a first pulley mounted on an axle of the said drum for rotation therewith, a second pulley smaller than the first pulley mounted on an axle of the inking roller for rotation therewith and a drive belt coupling the two pulleys, said first pulley being of such diameter that a portion of the drive belt carried on the first pulley projects through a second window substantially coplanar with the first a sufficient distance to contact the print receiving medium and by friction therewith cause rotation of the drum and inking roller as the print head is drawn across the surface of the said medium.

11. A print head according to claim 5 wherein said means for detecting the angular displacement of the drum comprises a transparent disc mounted on an axle of the said drum for rotation therewith, said disc bearing a coaxial, circular array of radial marks, a light emitting device disposed on one side of said disc in registration with said circular array of marks, and a light sensing device disposed on the other side of the disc in registration with said circular array of marks and the light emitting device.

12. In a printer of the type in which print is formed on a drum by an electrostatic process and is transferred therefrom onto a print receiving surface of a print medium by means solely of pressure acting between the print medium and the drum, in which said drum comprises an electrically conductive former having a cylindrical surface uniformly coated with a dielectric layer, an improved drum charging system for forming charge images on the drum in the shape of the characters to be printed, said system comprising an elastomeric laminate in the form of a strip having one end contacting each conductor of an array of parallel conductors and the other end wiping the dielectric surface of the drum along a line parallel to the drum axis, said laminate being formed by a plurality of contiguous layers which are alternately conductive and non-conductive, each of which layers is oriented to respectively extend from the array of conductors to the said drum in a plane normal to the axis of the latter.

13. A print head according to claim 12 wherein said array of parallel conductors comprises an array of conductors on a printed circuit board.

14. A print head according to claim 12 wherein the pitch of the conductive layers of the laminate strip is of the order of 4 thousandths of an inch.

15. A line printer comprising paper feed means for conveying paper past a printing station and a print head at said station for printing on said paper, said print head being as claimed in claim 12 wherein said print drum has a length corresponding to the length of a line of print and said array of conductors has a width corresponding to the length of the drum.

16. A line printer according to claim 15 comprising means for supplying said print head with signals to enable a whole page of print to be printed in one pass of the paper past the print head.

17. A line printer according to claim 16 comprising a housing containing said print head, a keyboard mounted on said housing for keying data into said printer, means for storing said data and a video means in said housing for displaying data keyed into said printer before it is printed out.

18. A print head as claimed in claim 14 wherein each conductor of said array is in contact with a plurality of said conductive layers.

* * * * *

UNITED STATES PATENT AND TRADEMARK OFFICE
CERTIFICATE OF CORRECTION

PATENT NO. : 4,326,458
DATED : April 27, 1982
INVENTOR(S) : W. L. Ross

It is certified that error appears in the above—identified patent and that said Letters Patent is hereby corrected as shown below:

At column 2, line 3, "commprises" should be --comprises--.

At column 4, line 33, "lead" should be --leads--.

At column 7, line 64, between "second" and "parallel" insert --plane--.

At column 9, line 61, delete "the".

Signed and Sealed this

*Twelfth* Day of *October 1982*

[SEAL]

*Attest:*

GERALD J. MOSSINGHOFF

*Attesting Officer* *Commissioner of Patents and Trademarks*